(12) United States Patent
Katoh et al.

(10) Patent No.: US 11,820,930 B2
(45) Date of Patent: Nov. 21, 2023

(54) POLYMER COMPOUND, LIQUID CRYSTAL COMPOSITION, PHASE DIFFERENCE LAYER, OPTICAL FILM, POLARIZING PLATE, AND IMAGE DISPLAY DEVICE

(71) Applicant: FUJIFILM Corporation, Tokyo (JP)

(72) Inventors: Shunya Katoh, Kanagawa (JP); Yuki Fukushima, Kanagawa (JP); Shuhei Okuda, Kanagawa (JP); Koji Iijima, Kanagawa (JP); Masato Nakao, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 285 days.

(21) Appl. No.: 17/208,255

(22) Filed: Mar. 22, 2021

(65) Prior Publication Data

US 2021/0207028 A1 Jul. 8, 2021

Related U.S. Application Data

(63) Continuation of application No. PCT/JP2019/035890, filed on Sep. 12, 2019.

(30) Foreign Application Priority Data

Sep. 25, 2018 (JP) .................. 2018-178464

(51) Int. Cl.
| | |
|---|---|
| C09D 133/16 | (2006.01) |
| C09K 19/04 | (2006.01) |
| C08G 61/04 | (2006.01) |
| C08J 5/18 | (2006.01) |
| G02B 5/30 | (2006.01) |
| G02F 1/1335 | (2006.01) |
| G02F 1/13363 | (2006.01) |
| G02F 1/1337 | (2006.01) |

(Continued)

(52) U.S. Cl.
CPC .............. *C09K 19/04* (2013.01); *C08G 61/04* (2013.01); *C08J 5/18* (2013.01); *C09D 133/14* (2013.01);

(Continued)

(58) Field of Classification Search
CPC .............. C08G 61/04; C08G 2261/146; C08G 2261/1424; C08G 2261/1426;

(Continued)

(56) References Cited

U.S. PATENT DOCUMENTS

2007/0098920 A1 5/2007 Yamamoto et al.
2011/0151381 A1 6/2011 Hasegawa et al.

(Continued)

FOREIGN PATENT DOCUMENTS

JP 2004-198511 A 7/2004
JP 2004-352818 A 12/2004

(Continued)

OTHER PUBLICATIONS

Office Action, issued by the State Intellectual Property Office dated Jan. 26, 2022, in connection with Chinese Patent Application No. 201980063194.0.

(Continued)

*Primary Examiner* — Ruiyun Zhang
(74) *Attorney, Agent, or Firm* — Edwards Neils LLC; Jean C. Edwards, Esq.

(57) ABSTRACT

An object of the present invention is to provide a polymer compound in which, by blending with a liquid crystal composition containing a liquid crystalline compound, alignment of the liquid crystalline compound in a phase difference layer to be obtained increases; and a liquid crystal composition, a phase difference layer, an optical film, a polarizing plate, and an image display device using the same. The polymer compound of the present invention is a polymer compound including a repeating unit represented by Formula (I), a repeating unit represented by Formula (II), a repeating unit represented by Formula (III), and a repeating unit represented by Formula (IV).

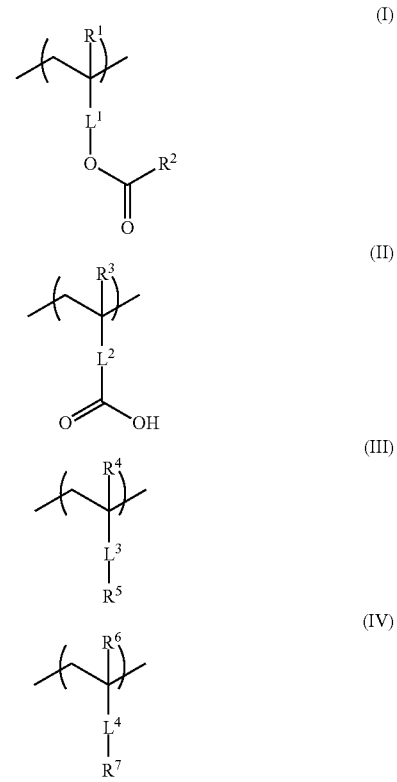

20 Claims, No Drawings

(51) Int. Cl.
*C09D 133/14* (2006.01)
*C09K 19/52* (2006.01)

(52) U.S. Cl.
CPC ............ *C09D 133/16* (2013.01); *C09K 19/52* (2013.01); *G02B 5/305* (2013.01); *G02F 1/13363* (2013.01); *G02F 1/133528* (2013.01); *G02F 1/133711* (2013.01); *C08G 2261/146* (2013.01); *C08G 2261/1424* (2013.01); *C08G 2261/1426* (2013.01); *C08G 2261/1432* (2013.01); *C08J 2300/102* (2013.01); *C08J 2300/105* (2013.01); *C08J 2300/106* (2013.01); *C09K 2019/0448* (2013.01); *C09K 2219/03* (2013.01)

(58) Field of Classification Search
CPC .... C09D 133/04; C09D 133/16; C09K 19/04; C09K 2019/0448; C09K 2219/03; C09K 2323/03; G02F 1/13363; G02F 1/133711; C08J 2300/102; C08J 2300/105; C08J 2300/106

USPC .......................................... 428/1.1, 1.3, 1.31
See application file for complete search history.

(56) References Cited

U.S. PATENT DOCUMENTS

2019/0170922 A1 6/2019 Katoh et al.
2020/0231727 A1 7/2020 Fukushima et al.

FOREIGN PATENT DOCUMENTS

| | | |
|---|---|---|
| JP | 2005-300759 A | 10/2005 |
| JP | 2005-315984 A | 11/2005 |
| JP | 2005-315985 A | 11/2005 |
| JP | 2011-132273 A | 7/2011 |
| JP | 2017-014481 A | 1/2017 |
| JP | 2017-065241 A | 4/2017 |
| JP | 2019-048975 A | 3/2019 |
| WO | 2018/030449 A1 | 2/2018 |
| WO | WO-2018174194 A1 * | 9/2018 ............... G02B 1/04 |
| WO | 2019/082960 A1 | 5/2019 |

OTHER PUBLICATIONS

International Search Report issued in PCT/JP2019/035890 dated Dec. 10, 2019.
Written Opinion issued in PCT/JP2019/035890 dated Dec. 10, 2019.
International Preliminary Report on Patentability completed by WIPO dated Mar. 23, 2021 in connection with International Patent Application No. PCT/JP2019/035890.

* cited by examiner

POLYMER COMPOUND, LIQUID CRYSTAL COMPOSITION, PHASE DIFFERENCE LAYER, OPTICAL FILM, POLARIZING PLATE, AND IMAGE DISPLAY DEVICE

CROSS-REFERENCE TO RELATED APPLICATIONS

This application is a Continuation of PCT International Application No. PCT/JP2019/035890 filed on Sep. 12, 2019, which was published under PCT Article 21(2) in Japanese, and which claims priority under 35 U.S.C. § 119(a) to Japanese Patent Application No. 2018-178464 filed on Sep. 25, 2018. The above applications are hereby expressly incorporated by reference, in their entirety, into the present application.

BACKGROUND OF THE INVENTION

1. Field of the Invention

The present invention relates to a polymer compound, a liquid crystal composition, a phase difference layer, an optical film, a polarizing plate, and an image display device.

2. Description of the Related Art

An optical film including a substrate and a phase difference layer is generally used for a liquid crystal display device.

For example, WO2018/030449A discloses "an optical film including a substrate, and a phase difference layer which is provided on the substrate to be adjacent to the substrate, in which the phase difference layer is a layer formed by fixing vertical alignment of a liquid crystalline compound having a polymerizable group included in a liquid crystal composition containing the liquid crystalline compound and a polymer compound, a difference in δa value between the polymer compound and the substrate, which is calculated using three-dimensional SP values, is 3 or less, and a content of the polymer compound is less than 10 parts by mass with respect to 100 parts by mass of the liquid crystalline compound" (claim 1 and the like). Further, in the optical film of WO2018/030449A, it is disclosed that the liquid crystalline compound in the phase difference layer exhibits high alignment (vertical alignment) (paragraph 0011 and the like). Furthermore, as an estimation mechanism to achieve such high alignment, it is disclosed that the polymer compound is localized near an interface with the substrate and alignment of the liquid crystalline compound in a vertical direction is promoted (paragraph 0016).

SUMMARY OF THE INVENTION

Under these circumstances, in a case where the present inventors have produced an optical film using the polymer compound disclosed in Examples and the like of WO2018/030449A and have evaluated alignment of the liquid crystalline compound in the phase difference layer, it is found that, considering the level of alignment which will increase further in the future, a polymer compound capable of further enhancing the alignment of the liquid crystalline compound is required.

In view of the above-described circumstances, an object of the present invention is to provide a polymer compound in which, by blending with a liquid crystal composition containing a liquid crystalline compound, alignment of the liquid crystalline compound in a phase difference layer to be obtained increases; and a liquid crystal composition, a phase difference layer, an optical film, a polarizing plate, and an image display device using the same.

As a result of intensive studies with regard to the above-described objects, the present inventors have found that the above-described objects can be achieved by a polymer compound having four specific repeating units, and have reached the present invention.

That is, the present inventors have found that the above-described objects can be achieved by the following configurations.

(1) A polymer compound comprising:
a repeating unit represented by Formula (I) described later;
a repeating unit represented by Formula (II) described later;
a repeating unit represented by Formula (III) described later; and
a repeating unit represented by Formula (IV) described later.

(2) The polymer compound according to (1),
in which an acid value of the polymer compound is 150 mgKOH/g to 250 mgKOH/g.

(3) The polymer compound according to (1) or (2),
in which a Log P value of the polymer compound is 1.2 to 1.8,
where the log P value is a sum total of products of a Log P value of a monomer as each repeating unit constituting the polymer compound and a mole fraction of each repeating unit.

(4) The polymer compound according to any one of (1) to (3),
in which a main chain of the polymer compound is an acrylic or methacrylic polymer.

(5) The polymer compound according to any one of (1) to (4),
in which the repeating unit represented by Formula (I) has an acetoacetyl group.

(6) The polymer compound according to any one of (1) to (5),
in which the repeating unit represented by Formula (I) is a repeating unit represented by Formula (V) described later.

(7) The polymer compound according to any one of (1) to (6),
in which the repeating unit represented by Formula (III) is a repeating unit represented by Formula (VI) described later.

(8) The polymer compound according to any one of (1) to (7),
in which the repeating unit represented by Formula (III) has at least one aliphatic cyclic structure.

(9) The polymer compound according to any one of (1) to (8),
in which the repeating unit represented by Formula (IV) is a repeating unit represented by Formula (VII) described later.

(10) The polymer compound according to any one of (1) to (9),
in which a weight-average molecular weight of the polymer compound is 5,000 to 500,000.

(11) A liquid crystal composition comprising:
the polymer compound according to any one of (1) to (10); and
a liquid crystalline compound having a polymerizable group.

(12) A phase difference layer formed of the liquid crystal composition according to (11).

(13) An optical film comprising:
the phase difference layer according to (12).

(14) A polarizing plate comprising:
the optical film according to (13).

(15) An image display device comprising:
the optical film according to (13); or
the polarizing plate according to (14).

As described below, according to the present invention, it is possible to provide a polymer compound in which, by blending with a liquid crystal composition containing a liquid crystalline compound, alignment of the liquid crystalline compound in a phase difference layer to be obtained increases; and a liquid crystal composition, a phase difference layer, an optical film, a polarizing plate, and an image display device using the same.

DESCRIPTION OF THE PREFERRED EMBODIMENTS

Hereinafter, the present invention will be described in detail.

The description of the constitutional requirements described below is made on the basis of representative embodiments of the present invention, but it should not be construed that the present invention is limited to those embodiments.

In this specification, numerical value ranges expressed by the term "to" mean that the numerical values described before and after "to" are included as a lower limit value and an upper limit value, respectively.

In addition, each component contained in the composition of the present invention may be used alone or in a combination of two or more kinds thereof. Here, in a case where two or more kinds are used in combination for each component, the content with regard to the component indicates the total content thereof, unless otherwise specified.

[Polymer Compound]

A polymer compound according to an embodiment of the present invention is a polymer compound including a repeating unit represented by Formula (I), a repeating unit represented by Formula (II), a repeating unit represented by Formula (III), and a repeating unit represented by Formula (IV). The polymer compound according to the embodiment of the present invention may include a repeating unit other than the above-described repeating units.

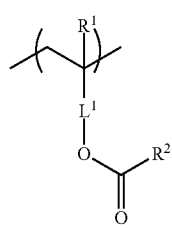

(I)

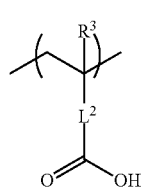

(II)

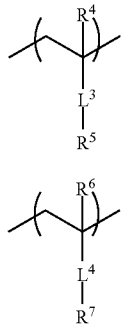

(III)

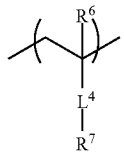

(IV)

In Formulae (I) to (IV), $R^1$, $R^3$, $R^4$, and $R^6$ each independently represent a hydrogen atom, or a methyl group, and $L^1$, $L^2$, $L^3$, and $L^4$ each independently represent a single bond or a divalent linking group selected from the group consisting of —O—, —C(=O)—, —(C=O)O—, —(C=O)NR$^8$—, a divalent aliphatic group which may have a substituent, a divalent aromatic group which may have a substituent, and a combination of these groups. $R^8$ represents a hydrogen atom or an alkyl group having 1 to 20 carbon atoms.

In Formula (I), $R^2$ represents an alkyl group having 1 to 30 carbon atoms, in which, in a case where $R^2$ is an alkyl group having 2 to 30 carbon atoms, one or more of —CH$_2$- constituting the alkyl group may be replaced with —COO— or —CO—.

In Formula (III), $R^5$ represents an aliphatic group having 3 to 20 carbon atoms.

In Formula (IV), $R^7$ represents an alkyl group having 4 to 20 carbon atoms, in which at least one hydrogen atom is replaced with a fluorine atom.

Since the polymer compound according to the embodiment of the present invention has such a configuration, it is considered that the above-described effects can be obtained. The reason is not clear, but is presumed to be as follows.

As described above, the polymer compound according to the embodiment of the present invention includes the repeating units represented by Formulae (I) to (IV). Among these, the repeating unit represented by Formula (I) has a high affinity with a substrate surface, and the repeating units represented by Formulae (III) and (IV) have a high affinity with an air surface (surface opposite to the substrate surface). Therefore, in a case of forming, on a substrate, a phase difference layer using a liquid crystal composition containing the polymer compound according to the embodiment of the present invention and a liquid crystalline compound, it is considered that the polymer compound is localized on both surfaces of the substrate surface and the air surface. As a result, in the phase difference layer to be formed, it is presumed that the liquid crystalline compound is sandwiched between the polymer compounds localized on both surfaces of the substrate surface and the air surface.

Here, since the polymer compound according to the embodiment of the present invention has a carboxy group (repeating unit represented by Formula (II)), it is considered that the surface energy of both surfaces of the substrate surface and the air surface is high, and the liquid crystalline compound sandwiched therebetween tends to be aligned in a vertical direction (perpendicular to the phase difference layer). In a case where the liquid crystal composition contains a vertical alignment agent such as an onium salt, it is considered that the vertical alignment agent also tends to be aligned in the vertical direction for the same reason, and alignment of the liquid crystalline compound is further increased.

[Repeating Unit (I)]

The polymer compound according to the embodiment of the present invention includes a repeating unit represented by Formula (I) (hereinafter, also referred to as a "repeating unit (I)").

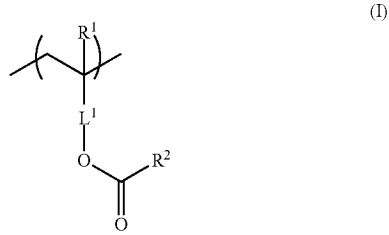

In Formula (I), $R^1$ represents a hydrogen atom or a methyl group.

In addition, in Formula (I), $L^1$ represents a single bond or a divalent linking group selected from the group consisting of —O—, —C(=O)—, —(C=O)O—, —(C=O)NR$^8$—, a divalent aliphatic group which may have a substituent, a divalent aromatic group which may have a substituent, and a combination of these groups. $R^8$ represents a hydrogen atom or an alkyl group having 1 to 20 carbon atoms.

In addition, in Formula (I), $R^2$ represents an alkyl group having 1 to 30 carbon atoms. However, in a case where $R^2$ is an alkyl group having 2 to 30 carbon atoms, one or more of —CH$_2$— constituting the alkyl group may be replaced with —COO— or —CO—.

Hereinafter, the above-mentioned divalent linking group represented by one aspect of $L^1$ in Formula (I) will be described.

First, in —(C=O)NR$^8$— represented by one aspect of L in Formula (I), as described above, $R^8$ represents a hydrogen atom or an alkyl group having 1 to 20 carbon atoms.

Here, from the reason that the alignment of the liquid crystalline compound in the phase difference layer to be obtained further increases and surface unevenness of the phase difference layer to be obtained is suppressed, the alkyl group having 1 to 20 carbon atoms is preferably a linear, branched, or cyclic alkyl group having 1 to 18 carbon atoms, more preferably an alkyl group (such as a methyl group, an ethyl group, a propyl group, an isopropyl group, an n-butyl group, an isobutyl group, a sec-butyl group, a t-butyl group, and a cyclohexyl group) having 1 to 8 carbon atoms, still more preferably an alkyl group having 1 to 4 carbon atoms, and particularly preferably a methyl group or an ethyl group.

Hereinafter, "the alignment of the liquid crystalline compound in the phase difference layer to be obtained further increases and surface unevenness of the phase difference layer to be obtained is suppressed" is also referred to as "the effects of the present invention are more excellent".

In addition, in the divalent aliphatic group which may have a substituent and the divalent aromatic group which may have a substituent, which are represented by one aspect of $L^1$ in Formula (I), specific examples of the substituent which may be included therein include an alkyl group, an alkoxy group, a halogen atom, and a hydroxyl group.

Here, from the reason that the effects of the present invention are more excellent, the alkyl group is preferably a linear, branched, or cyclic alkyl group having 1 to 18 carbon atoms, more preferably an alkyl group (such as a methyl group, an ethyl group, a propyl group, an isopropyl group, an n-butyl group, an isobutyl group, a sec-butyl group, a t-butyl group, and a cyclohexyl group) having 1 to 8 carbon atoms, still more preferably an alkyl group having 1 to 4 carbon atoms, and particularly preferably a methyl group or an ethyl group.

In addition, from the reason that the effects of the present invention are more excellent, the alkoxy group is preferably an alkoxy group having 1 to 18 carbon atoms, more preferably an alkoxy group (such as a methoxy group, an ethoxy group, an n-butoxy group, and a methoxyethoxy group) having 1 to 8 carbon atoms, still more preferably an alkoxy group having 1 to 4 carbon atoms, and particularly preferably a methoxy group or an ethoxy group.

In addition, from the reason that the effects of the present invention are more excellent, examples of the halogen atom include a fluorine atom, a chlorine atom, a bromine atom, and an iodine atom. Among these, a fluorine atom or a chlorine atom is preferable.

Examples of the divalent aliphatic group which may have a substituent include a linear, branched, or cyclic alkylene group having 1 to 10 carbon atoms, which may have the above-described substituent.

Here, specific examples of the linear alkylene group include a methylene group, an ethylene group, a propylene group, a butylene group, a pentylene group, a hexylene group, and a decylene group.

In addition, specific examples of the branched alkylene group include a dimethylmethylene group, a methylethylene group, a 2,2-dimethylpropylene group, and a 2-ethyl-2-methylpropylene group.

In addition, specific examples of the cyclic alkylene group include a cyclopropylene group, a cyclobutylene group, a cyclopentylene group, a cyclohexylene group, a cyclooctylene group, a cyclodecylene group, an adamantane-diyl group, a norbornane-diyl group, and an exo-tetrahydrodicyclopentadiene-diyl group. Among these, from the reason that the effects of the present invention are more excellent, a cyclohexylene group is preferable.

In addition, examples of the divalent aromatic group which may have a substituent include an arylene group having 6 to 12 carbon atoms, which may have the above-described substituent.

Here, specific examples of the arylene group having 6 to 12 carbon atoms include a phenylene group, a xylylene group, a biphenylene group, a naphthylene group, and a 2,2'-methylenebisphenyl group. Among these, from the reason that the effects of the present invention are more excellent, a phenylene group is preferable.

In the present invention, from the reason that the effects of the present invention are more excellent, $L^1$ in Formula (I) is preferably not a single bond but the above-described divalent linking group, more preferably a divalent linking group including —(C=O)O— in a moiety linked to the main chain, and still more preferably a divalent linking group having —(C=O)O— in a moiety linked to the main chain and having a divalent aliphatic group (particularly, a linear alkylene group).

Next, the alkyl group having 1 to 30 carbon atoms represented by $R^2$ in Formula (I) will be described. As described above, in a case where $R^2$ is an alkyl group having 2 to 30 carbon atoms, one or more of —CH$_2$— constituting the alkyl group may be replaced with —COO— or —CO—.

From the reason that the effects of the present invention are more excellent, the alkyl group having 1 to 30 carbon atoms represented by $R^2$ in Formula (I) is preferably a linear, branched, or cyclic alkyl group having 1 to 18 carbon atoms, more preferably an alkyl group (such as a methyl group, an ethyl group, a propyl group, an isopropyl group, an n-butyl group, an isobutyl group, a sec-butyl group, a t-butyl group, and a cyclohexyl group) having 1 to 8 carbon atoms, still more preferably an alkyl group having 1 to 4 carbon atoms, and particularly preferably an ethyl group.

In addition, in a case where $R^2$ in Formula (I) is an ethyl group, —$CH_2$— constituting the ethyl group is most preferably replaced with —CO—.

In the present invention, from the reason that the affinity with the substrate is increased and the effect of localizing the polymer compound to the substrate surface is large, it is preferable that the repeating unit (I) has an acetoacetyl group.

In addition, in the present invention, from the reason that the affinity with the substrate is increased and the effect of localizing the polymer compound to the substrate surface is large, it is preferable that the repeating unit (I) is a repeating unit represented by Formula (V). In Formula (V), $R^9$ represents a hydrogen atom or a methyl group.

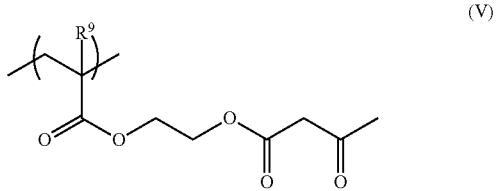

(V)

Specific examples of a monomer as the repeating unit (I) include acetoacetoxyethyl (meth)acrylate, acetoacetoxypropyl (meth)acrylate, and N-(2-acetoacetoxyethyl) (meth)acrylamide.

Here, the term "(meth)acrylate" is a notation meaning acrylate or methacrylate, and the term "(meth)acrylamide" is a notation meaning acrylamide or methacrylamide.

In the polymer compound according to the embodiment of the present invention, from the reason that the effects of the present invention are more excellent, the content of the repeating unit (I) is preferably 10% to 90% by mass, more preferably 20% to 80% by mass, still more preferably 30% to 70% by mass, and particularly preferably 40% to 60% by mass.

In addition, in the polymer compound according to the embodiment of the present invention, from the reason that the effects of the present invention are more excellent, the content of the repeating unit (I) is preferably 10% to 80% by mole, more preferably 20% to 70% by mole, still more preferably 30% to 60% by mole, and particularly preferably 40% to 50% by mole.

[Repeating Unit (II)]

The polymer compound according to the embodiment of the present invention includes a repeating unit represented by Formula (II) (hereinafter, also referred to as a "repeating unit (II)").

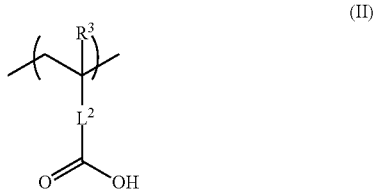

(II)

In Formula (II), $R^3$ represents a hydrogen atom or a methyl group.

In addition, in Formula (II), $L^2$ represents a single bond or a divalent linking group selected from the group consisting of —O—, —C(=O)—, —(C=O)O—, —(C=O)NR^8—, a divalent aliphatic group which may have a substituent, a divalent aromatic group which may have a substituent, and a combination of these groups. $R^8$ represents a hydrogen atom or an alkyl group having 1 to 20 carbon atoms. From the reason that the effects of the present invention are more excellent, $L^2$ is preferably a single bond.

Here, the above-mentioned divalent linking group represented by one aspect of $L^2$ in Formula (II) is the same as the above-described divalent linking group represented by one aspect of $L^1$ in Formula (I).

In the divalent aliphatic group which may have a substituent and the divalent aromatic group which may have a substituent, which are represented by one aspect of $L^2$ in Formula (II), the substituent which may be included therein is the same as in the description of $L^1$ in Formula (I).

In the present invention, from the reason that radical polymerization is possible, $L^2$ in Formula (II) is preferably a divalent linking group selected from the group consisting of —C(=O)—, —(C=O)—, a divalent aliphatic group which may have a substituent, and a combination of these groups, and more preferably a divalent linking group having —(C=O)O— in a moiety linked to the main chain and having a divalent aliphatic group.

Examples of a monomer as the repeating unit (II) include (meth)acrylic acid. Here, the term "(meth)acrylic acid" is a notation meaning acrylic acid or methacrylic acid.

In the polymer compound according to the embodiment of the present invention, from the reason that the effects of the present invention are more excellent, the content of the repeating unit (II) is preferably 1% to 50% by mass, more preferably 2% to 40% by mass, still more preferably 3% to 30% by mass, and particularly preferably 4% to 20% by mass.

In addition, in the polymer compound according to the embodiment of the present invention, from the reason that the effects of the present invention are more excellent, the content of the repeating unit (II) is preferably 1% to 80% by mole, more preferably 5% to 70% by mole, still more preferably 10% to 60% by mole, and particularly preferably 15% to 50% by mole.

[Repeating Unit (III)]

The polymer compound according to the embodiment of the present invention includes a repeating unit represented by Formula (III) (hereinafter, also referred to as a "repeating unit (III)").

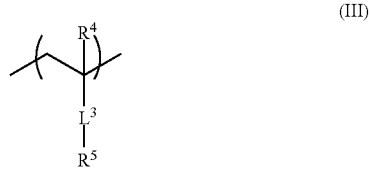

(III)

In Formula (III), $R^4$ represents a hydrogen atom or a methyl group.

In addition, in Formula (III), $L^3$ represents a single bond or a divalent linking group selected from the group consisting of —O—, —C(=O)—, —(C=O)O—, —(C=O)NR^8—, a divalent aliphatic group which may have a substituent, a divalent aromatic group which may have a substituent, and a combination of these groups. $R^8$ represents a hydrogen atom or an alkyl group having 1 to 20 carbon atoms.

In addition, in Formula (III), $R^5$ represents an aliphatic group having 3 to 20 carbon atoms.

Here, the above-mentioned divalent linking group represented by one aspect of $L^3$ in Formula (III) is the same as the above-described divalent linking group represented by one aspect of $L^1$ in Formula (I).

In the divalent aliphatic group which may have a substituent and the divalent aromatic group which may have a substituent, which are represented by one aspect of $L^3$ in Formula (III), the substituent which may be included therein is the same as in the description of $L^1$ in Formula (I).

In the present invention, from the reason that radical polymerization is possible, $L^3$ in Formula (III) is preferably a divalent linking group selected from the group consisting of —C(=O)—, —(C=O)O—, a divalent aliphatic group which may have a substituent, and a combination of these groups, and more preferably a divalent linking group having —(C=O)O— in a moiety linked to the main chain.

Next, the aliphatic group having 3 to 20 carbon atoms represented by $R^5$ in Formula (III) will be described.

The aliphatic group having 3 to 20 carbon atoms, which is represented by $R^5$ in Formula (III), may be linear, branched, or cyclic, but from the reason that the effects of the present invention are more excellent, it is preferable to have at least one cyclic structure. Specific examples of $R^5$ include an alkyl group having 3 to 20 carbon atoms, a monocyclic alkyl group having 3 to 20 carbon atoms, such as a cyclohexyl group, and a polycyclic alkyl group having 8 to 20 carbon atoms, such as an adamantyl group and an isobornyl group.

From the reason that the effects of the present invention are more excellent, the repeating unit (III) is preferably a repeating unit represented by Formula (VI).

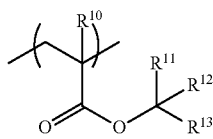

In Formula (VI), $R^{10}$ represents a hydrogen atom or a methyl group.

In addition, $R^{11}$, $R^{12}$, and $R^{13}$ each independently represent a hydrogen atom or an aliphatic group (for example, an alkyl group) having 1 to 19 carbon atoms. However, the total number of carbon atoms of $R^{11}$, $R^{12}$, and $R^{13}$ is 2 to 19, and at least one of $R^{11}$, $R^{12}$, or $R^{13}$ is a hydrogen atom. $R^{11}$, $R^{12}$, and $R^{13}$ may be linked to each other to form a cyclic structure.

Examples of a monomer as the repeating unit (III) include isoboronyl (meth)acrylate, lauryl (meth)acrylate, dicyclopentanyl (meth)acrylate, 2-methyl-2-adamantyl (meth)acrylate, 1-adamantyl (meth)acrylate, cyclohexyl (meth)acrylate, 2-ethylhexyl (meth)acrylate, and t-butyl (meth) acrylate. Among the above-described examples, isoboronyl (meth)acrylate, lauryl (meth)acrylate, dicyclopentanyl (meth)acrylate, cyclohexyl (meth)acrylate, or 2-ethylhexyl (meth)acrylate, which is a monomer as the above-described repeating unit represented by Formula (VI), is preferable.

In the polymer compound according to the embodiment of the present invention, from the reason that the effects of the present invention are more excellent, the content of the repeating unit (III) is preferably 1% to 50% by mass, more preferably 2% to 40% by mass, still more preferably 3% to 30% by mass, and particularly preferably 4% to 20% by mass.

In addition, in the polymer compound according to the embodiment of the present invention, from the reason that the effects of the present invention are more excellent, the content of the repeating unit (III) is preferably 1% to 50% by mole, more preferably 2% to 40% by mole, still more preferably 3% to 30% by mole, and particularly preferably 4% to 20% by mole.

[Repeating Unit (IV)]

The polymer compound according to the embodiment of the present invention includes a repeating unit represented by Formula (IV) (hereinafter, also referred to as a "repeating unit (IV)").

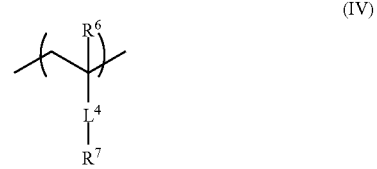

In Formula (IV), $R^6$ represents a hydrogen atom or a methyl group.

In addition, in Formula (IV), $L^4$ represents a single bond or a divalent linking group selected from the group consisting of —O—, —C(=O)—, —(C=O)O—, —(C=O)NR$^8$—, a divalent aliphatic group which may have a substituent, a divalent aromatic group which may have a substituent, and a combination of these groups. $R^8$ represents a hydrogen atom or an alkyl group having 1 to 20 carbon atoms.

In addition, in Formula (IV), $R^7$ represents an alkyl group having 4 to 20 carbon atoms, in which at least one hydrogen atom is replaced with a fluorine atom.

Here, the above-mentioned divalent linking group represented by one aspect of $L^4$ in Formula (IV) is the same as the above-described divalent linking group represented by one aspect of $L^1$ in Formula (I).

In addition, in the alkyl group having 4 to 20 carbon atoms represented by $R^7$ in Formula (IV), in which at least one hydrogen atom is replaced with a fluorine atom, examples of an alkyl group before the replacement include a linear, branched, or cyclic alkyl group having 4 to 18 carbon atoms, and suitable examples thereof include a linear alkyl group (such as a butyl group, a hexyl group, an octyl group, and a dodecyl group) having 4 to 12 carbon atoms.

The repeating unit (IV) is preferably a repeating unit represented by Formula (VII).

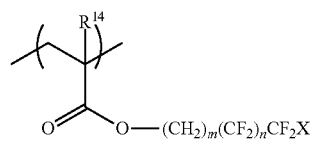

In Formula (VII), $R^{14}$ represents a hydrogen atom or a methyl group, and X represents a hydrogen atom or a fluorine atom. m and n each independently represent an integer of 1 to 20, and m+n represents an integer of 4 to 21.

Specific examples of a monomer as the repeating unit (IV) include 2-(perfluorobutyl)ethyl (meth)acrylate, 2-(perfluorohexyl)ethyl (meth)acrylate, 1H,1H,7H-dodecafluoroheptyl (meth)acrylate, and 4-(perfluoropentyloxy)benzyl (meth)acrylate.

In the polymer compound according to the embodiment of the present invention, from the reason that the effects of the present invention are more excellent, the content of the repeating unit (IV) is preferably 1% to 50% by mass, more preferably 2% to 40% by mass, still more preferably 5% to 35% by mass, and particularly preferably 10% a to 30% by mass.

In addition, in the polymer compound according to the embodiment of the present invention, from the reason that the effects of the present invention are more excellent, the content of the repeating unit (IV) is preferably 1% to 50% by mole, more preferably 2% to 40% by mole, still more preferably 3% to 30% by mole, and particularly preferably 4% to 25% by mole.

[Preferred Aspect of Main Chain]

From the reason that the molecular design of the side chain is diversified and the main chain is easily formed by an addition polymerization, the main chain of the polymer compound according to the embodiment of the present invention is preferably an acrylic or methacrylic polymer.

[Acid Value]

The acid value of the polymer compound according to the embodiment of the present invention is not particularly limited, but from the reason that the effects of the present invention are more excellent, the acid value is preferably 100 to 300 mgKOH/g, more preferably 150 to 250 mgKOH/g, still more preferably 160 to 240 mgKOH/g, and particularly preferably 180 to 220 mgKOH/g.

Here, the acid value represents the number of milligrams of an amount of potassium hydroxide, which is required to neutralize acid group (for example, a carboxy group, a sulfonic acid group, an activated methylene group, and the like) contained in 1 g of a polymer compound, and is a value measured by a potentiometric titration (JIS K 0070:1992).

[Log P Value]

The Log P value of the polymer compound according to the embodiment of the present invention is not particularly limited, but from the reason that the effects of the present invention are more excellent, the Log P value is preferably 0.5 to 2.5 and more preferably 1.2 to 1.8.

Here, the log P value is the sum total of products of the Log P value of a monomer as each repeating unit constituting the polymer compound and the mole fraction of each repeating unit. It is assumed that the Log P value of the monomer is calculated by using ChemDraw of PerkinElmer Inc.

For example, in the polymer compound (A-1) described later, since a monomer as the repeating unit (1) is ethylene glycol monoacetoacetate monomethacrylate (AAEM) and the mole fraction thereof is 36%, a monomer as the repeating unit (II) is methacrylic acid (MA) and the mole fraction thereof is 34%, a monomer as the repeating unit (III) is isoboronyl methacrylate (IBXMA) and the mole fraction thereof is 13%, and a monomer as the repeating unit (IV) is 2-(perfluorobutyl)ethyl methacrylate (PFBMA) and the mole fraction thereof is 17%, the Log P value of the polymer compound (A-1) is (Log P value of AAEM)×0.36+(Log P value of MA)×0.34+(Log P value of IBXMA)×0.13+(Log P value of PFBMA)×0.17.

[Weight-Average Molecular Weight]

The weight-average molecular weight (Mw) of the polymer compound according to the embodiment of the present invention is not particularly limited, but from the reason that the alignment is further improved and the surface unevenness can be further suppressed, the weight-average molecular weight is preferably 5,000 to 500,000, more preferably 5,000 to 100,000, and still more preferably 10,000 to 100,000.

Here, the weight-average molecular weight of the polymer compound is defined as a value in terms of polystyrene measured by gel permeation chromatography (GPC). The weight-average molecular weight of the polymer compound can be measured, for example, under measurement conditions of a flow rate of 0.50 ml/min and a temperature of 40° C., using EcoSEC HLC-8320 GPC (manufactured by Tosoh Corporation) as a GPC device, three TSKgel SuperAWM-H (manufactured by Tosoh Corporation) as a column, and N-methylpyrrolidone (NMP) as an eluent, and calculated as a value in terms of polystyrene.

Specific examples of the polymer compound according to the embodiment of the present invention are described below, but the present invention is not limited thereto.

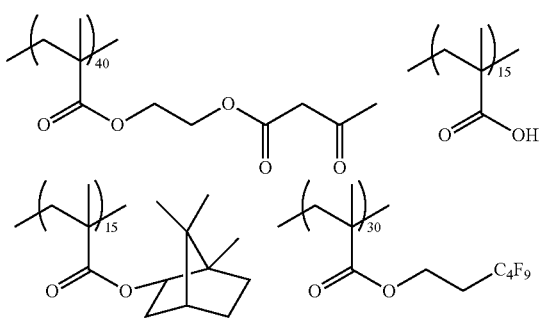

(A-1)

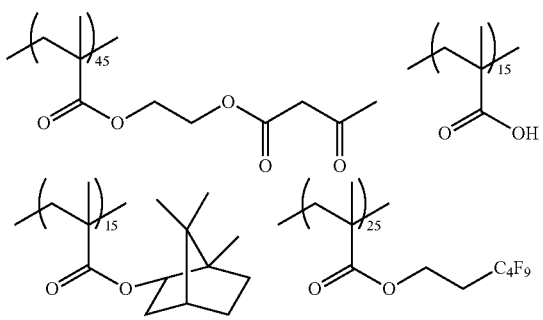

(A-2)

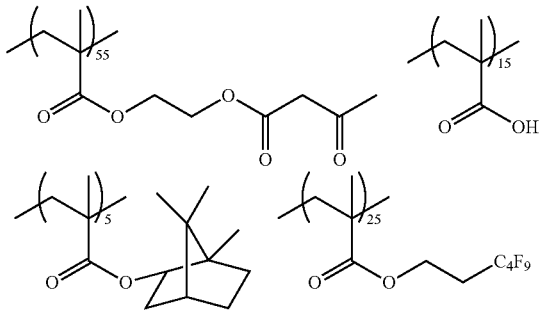

(A-3)

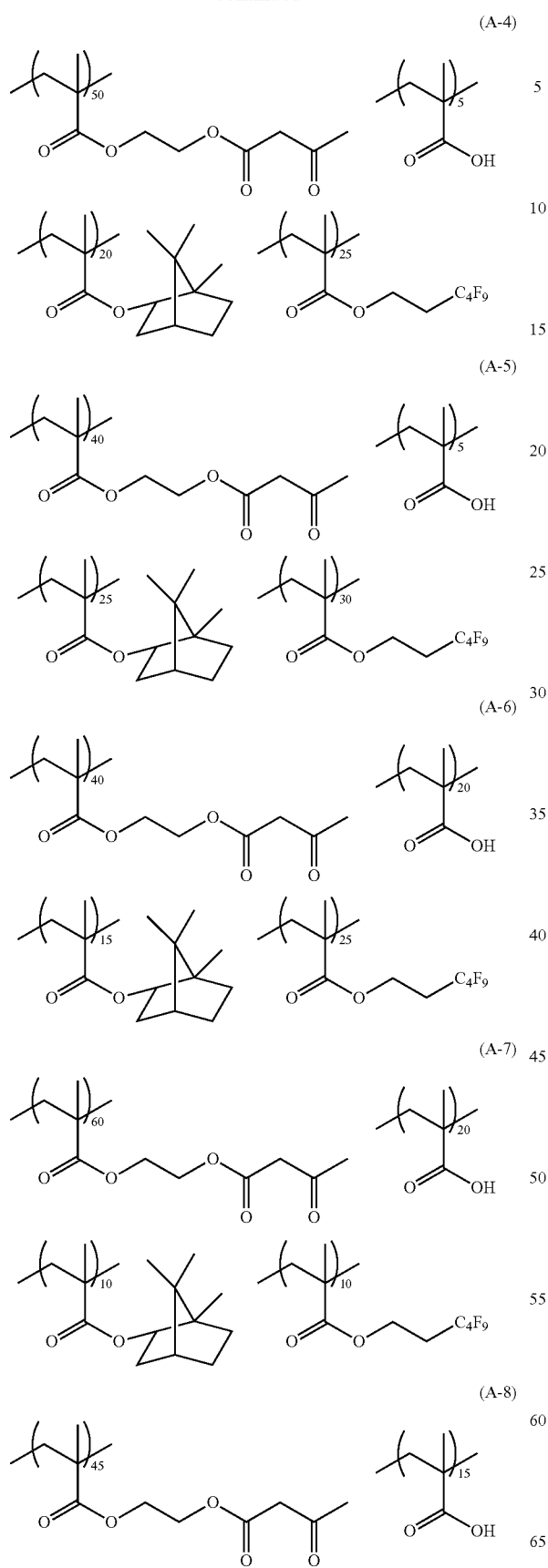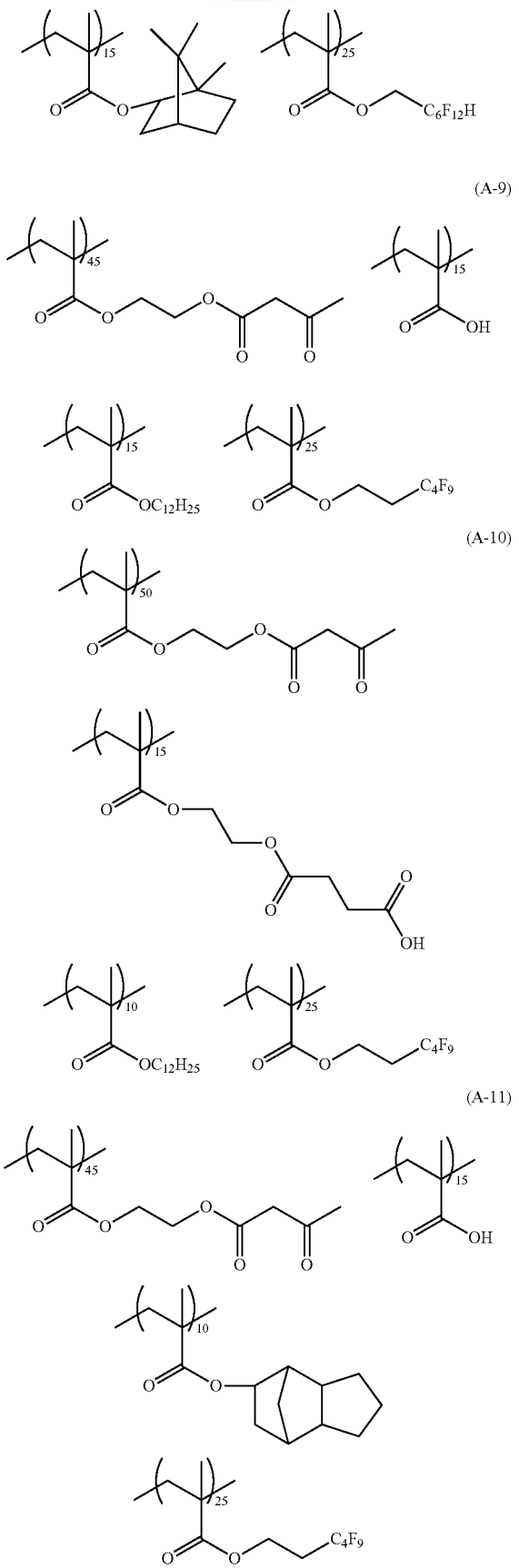

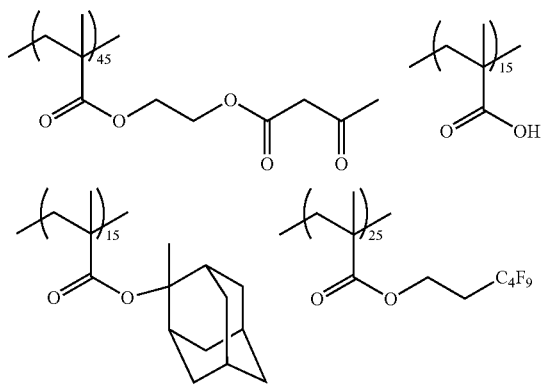
(A-12)
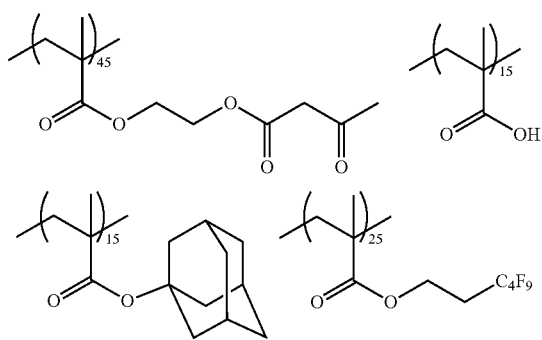
(A-13)
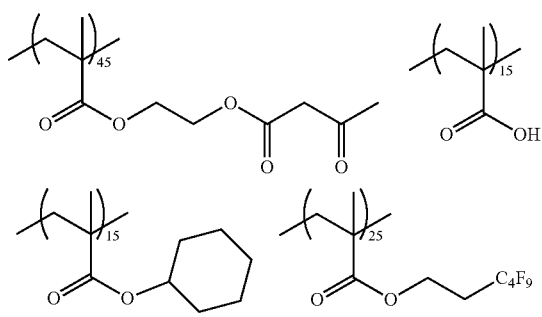
(A-14)
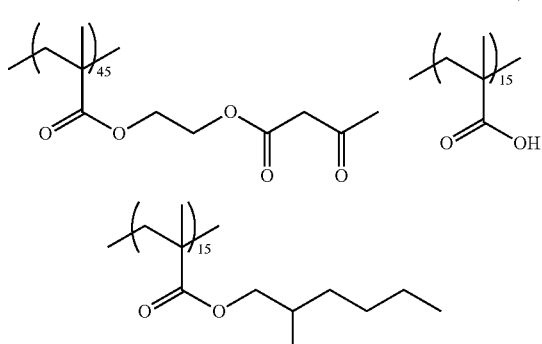
(A-15)
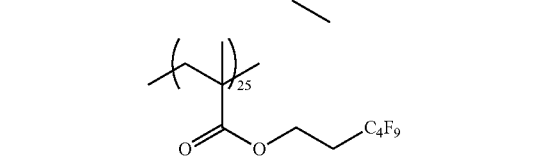
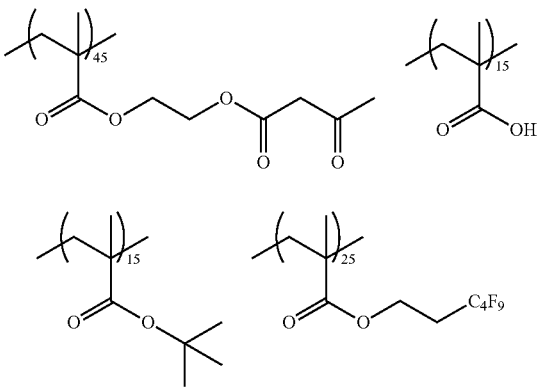
(A-16)
(A-17)
(A-18)
(A-19)
(A-20)

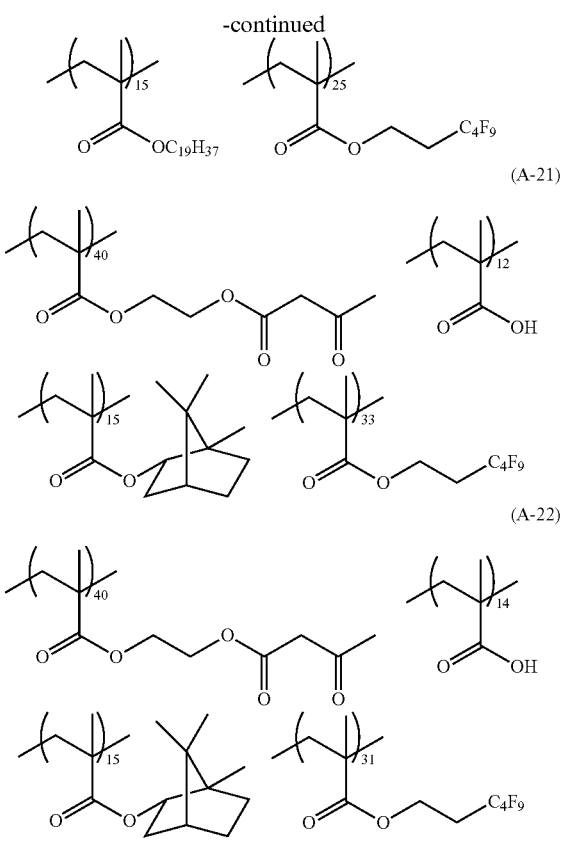

Numbers in Formulae (A-1) to (A-22) described above represent the content (% by mass) of each repeating unit.

[Liquid Crystal Composition]

A liquid crystal composition according to an embodiment of the present invention is a liquid crystal composition containing the polymer compound according to the embodiment of the present invention and a liquid crystalline compound having a polymerizable group.

[Liquid Crystalline Compound]

The liquid crystalline compound contained in the liquid crystal composition according to the embodiment of the present invention is not particularly limited as long as the liquid crystalline compound has a polymerizable group, and a known liquid crystalline compound in the related art can be used.

Here, specific examples of the polymerizable group include an acryloyl group, a methacryloyl group, a vinyl group, a styryl group, and an allyl group. Among these, from the reason that the effects of the present invention are more excellent, an acryloyl group or a methacryloyl group is preferable.

Generally, liquid crystalline compounds are classified into a rod-like type and a disk-like type according to the shape thereof. Furthermore, each type includes a low molecular type and a polymer type. The term "polymer" generally refers to a compound having a degree of polymerization of 100 or more (Polymer Physics-Phase Transition Dynamics, by Masao Doi, p. 2, published by Iwanami Shoten, 1992).

In the present invention, any type of liquid crystalline compound can be used, but from the reason that the effects of the present invention are more excellent, a rod-like liquid crystalline compound or a disk-like liquid crystalline compound (discotic liquid crystalline compound) is preferably used. Two or more kinds of rod-like liquid crystalline compounds, two or more kinds of disk-like liquid crystalline compounds, or a mixture of a rod-like liquid crystalline compound and a disk-like liquid crystalline compound may be used.

In addition, from the viewpoint of fixing an alignment, the liquid crystalline compound preferably has two or more polymerizable groups described above. In the case of a mixture of two or more kinds of liquid crystalline compounds, at least one kind of the liquid crystalline compound preferably has two or more polymerizable groups in one molecule.

As the rod-like liquid crystalline compound, for example, the rod-like liquid crystalline compounds described in claim 1 of JP1999-513019A (JP-H11-513019A) or paragraphs 0026 to 0098 of JP2005-289980A can be preferably used, and as the discotic liquid crystalline compounds, for example, the discotic liquid crystalline compounds described in paragraphs 0020 to 0067 of JP2007-108732A or paragraphs 0013 to 0108 of JP2010-244038A can be preferably used, but the liquid crystalline compounds are not limited thereto.

In the present invention, from the reason that the effects of the present invention are more excellent, it is preferable to use a rod-like liquid crystalline compound as the liquid crystalline compound, and for example, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexyl benzonitriles are preferably used.

[Polymer Compound]

As described above, the composition of the present invention contains the above-described polymer compound according to the embodiment of the present invention.

In the liquid crystal composition according to the embodiment of the present invention, from the reason that the effects of the present invention are more excellent, the content of the polymer compound according to the embodiment of the present invention is preferably less than 10 parts by mass, more preferably 0.5 parts by mass or more and less than 10 parts by mass, still more preferably 1 to 8 parts by mass, and particularly preferably 1 to 5 parts by mass with respect to 100 parts by mass of the above-described liquid crystalline compound.

[Vertical Alignment Agent]

From the reason that the alignment is further improved, the liquid crystal composition according to the embodiment of the present invention preferably contains a vertical alignment agent.

Examples of the vertical alignment agent include an onium salt compound and a boronic acid compound. Among these, from the reason that the effects of the present invention are more excellent, an onium salt compound is preferable.

<Onium Salt Compound>

As the onium salt compound, a known onium salt compound as a vertical alignment agent can be used. Specific examples thereof include the compounds described in paragraphs 0042 to 0052 of JP2016-105127A.

In a case where the liquid crystal composition contains the onium salt compound, from the reason that the effects f the present invention are more excellent, the content of the onium salt compound is preferably 0.5 to 5 parts by mass and more preferably 1 to 3 parts by mass with respect to 100 parts by mass of the above-described liquid crystalline compound.

<Boronic Acid Compound>

As the boronic acid compound, a known boronic acid compound as a vertical alignment agent can be used. Specific examples thereof include the compounds described in paragraphs 0053 and 0054 of JP2016-105127A.

In a case where the liquid crystal composition contains the boronic acid compound, the content of the boronic acid compound is preferably 0.1 to 5 parts by mass and more preferably 0.5 to 3 parts by mass with respect to 100 parts by mass of the above-described liquid crystalline compound.

[Polymerization Initiator]

From the reason that the effects of the present invention are more excellent, the liquid crystal composition according to the embodiment of the present invention preferably contains a polymerization initiator.

From the reason that the effects of the present invention are more excellent, the polymerization initiator to be used is preferably a photopolymerization initiator capable of initiating a polymerization reaction by irradiation with ultraviolet rays.

Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), oxadiazole compounds (described in U.S. Pat. No. 4,212,970A), and acyl phosphine oxide compounds (described in JP1988-040799B (JP-S63-040799B), JP1993-029234B (JP-H05-029234B), JP1998-095788A (JP-H10-095788A), and JP1998-029997A (JP-H10-029997A)).

In the liquid crystal composition according to the embodiment of the present invention, the content of the polymerization initiator is not particularly limited, but from the reason that the effects of the present invention are more excellent, the content thereof is preferably 1 to 10 parts by mass with respect to 100 parts by mass of the above-described liquid crystalline compound.

[Polymerizable Monomer]

From the viewpoint of evenness of the coating film and hardness of the phase difference layer, the liquid crystal composition according to the embodiment of the present invention may include a polymerizable monomer.

Examples of the polymerizable monomer include radically polymerizable or cationically polymerizable compounds. Preferably, a polymerizable monomer which is a polyfunctional radically polymerizable monomer and is copolymerizable with a disk-like liquid crystalline compound containing the above-described polymerizable group is preferable. Examples thereof include compounds described in paragraphs 0018 to 0020 of JP2002-296423A.

In the liquid crystal composition according to the embodiment of the present invention, the content of the polymerizable monomer is not particularly limited, but from the reason that the effects of the present invention are more excellent, the content thereof is preferably 1 to 10 parts by mass with respect to 100 parts by mass of the above-described liquid crystalline compound.

[Surfactant]

From the viewpoint of evenness of the coating film and hardness of the phase difference layer, the liquid crystal composition according to the embodiment of the present invention may include a surfactant.

Examples of the surfactant include a known compound in the related art, and a fluorine-based compound is particularly preferable. Specific examples thereof include compounds described in paragraphs 0028 to 0056 of JP2001-330725A, and compounds described in paragraphs 0069 to 0126 of JP2003-295212.

In the liquid crystal composition according to the embodiment of the present invention, the content of the surfactant is not particularly limited, but from the reason that the effects of the present invention are more excellent, the content thereof is preferably 0.01 to 10 parts by mass and more preferably 0.1 to 1 parts by mass with respect to 100 parts by mass of the above-described liquid crystalline compound.

[Solvent]

From the viewpoint of workability to form the phase difference layer, the liquid crystal composition according to the embodiment of the present invention preferably contains a solvent.

Specific examples of the solvent include ketones (for example, acetone, 2-butanone, methyl ethyl ketone, methyl isobutyl ketone, cyclohexanone, cyclopentanone, and the like), ethers (for example, dioxane, tetrahydrofuran, and the like), aliphatic hydrocarbons (for example, hexane and the like), alicyclic hydrocarbons (for example, cyclohexane and the like), aromatic hydrocarbons (for example, toluene, xylene, trimethylbenzene, and the like), halogenated carbons (for example, dichloromethane, dichloroethane, dichlorobenzene, chlorotoluene, and the like), esters (for example, methyl acetate, ethyl acetate, butyl acetate, and the like), water, alcohols (for example, ethanol, isopropanol, butanol, cyclohexanol, and the like), cellosolves (for example, methyl cellosolve, ethyl cellosolve, and the like), cellosolve acetates, sulfoxides (for example, dimethyl sulfoxide and the like), and amides (for example, dimethyl formamide, dimethyl acetamide, and the like), and these solvents may be used alone or in a combination of two or more kinds thereof.

[Phase Difference Layer]

A phase difference layer according to an embodiment of the present invention is a phase difference layer formed of the liquid crystal composition according to the embodiment of the present invention, and is a layer formed by fixing the vertical alignment of the liquid crystalline compound contained in the liquid crystal composition according to the embodiment of the present invention.

Here, the vertical alignment in a case where the liquid crystalline compound is a rod-like liquid crystalline compound is also referred to as a homeotropic alignment and means an alignment in which an angle between a surface of the substrate and a director of the rod-like liquid crystalline compound is within a range of 70° to 90°. An alignment in which the above-described angle is within a range of 80° to 90° is preferable, and an alignment in which the above-described angle is within a range of 85° to 90° is more preferable.

In addition, the vertical alignment in a case where the liquid crystalline compound is a disk-like liquid crystalline compound means an alignment in which an angle between the surface of the substrate described later and a plane of the disk of the disk-like liquid crystalline compound is within a range of 70° to 90°. An alignment in which the above-described angle is within a range of 80° to 90° is preferable, and an alignment in which the above-described angle is within a range of 85° to 90° is more preferable.

[Method for Forming Phase Difference Layer]

In the present invention, examples of a method for forming the phase difference layer include a method in which the liquid crystal composition according to the embodiment of the present invention is applied to the substrate described later to attain a desired alignment state and then the alignment state is fixed by polymerization.

Examples of the method of applying the liquid crystal composition include a wire bar coating method, an extrusion coating method, a direct gravure coating method, a reverse gravure coating method, and a die-coating method.

The polymerization conditions are not particularly limited, but from the reason that the effects of the present invention are more excellent, in polymerization by light irradiation, ultraviolet rays are preferably used. From the reason that the effects of the present invention are more excellent, the irradiation dose is preferably 10 $mJ/cm^2$ to 50 $J/cm^2$, more preferably 20 $mJ/cm^2$ to $5/cm^2$, still more preferably 30 $mJ/cm^2$ to 3 $J/cm^2$, and particularly preferably 50 to 1000 $mJ/cm^2$. In addition, in order to promote the polymerization reaction, polymerization may be performed under heating conditions.

[Optical Film]

An optical film according to an embodiment of the present invention is an optical film having the phase difference layer according to the embodiment of the present invention.

In addition, it is preferable that the optical film according to the embodiment of the present invention has an aspect having a substrate and the phase difference layer according to the embodiment of the present invention, which is provided on the substrate to be adjacent to the substrate.

Hereinafter, various members used for the optical film according to the embodiment of the present invention will be described in detail.

[Substrate]

The above-mentioned substrate is a substrate for supporting the phase difference layer according to the embodiment of the present invention, and examples thereof include a substrate to which the liquid crystal composition is applied in a case where the phase difference layer is formed by applying the liquid crystal composition according to the embodiment of the present invention. In the present invention, the polarizer described later may have an aspect also serving as the above-described substrate.

Such a substrate is preferably transparent, and specifically, the substrate preferably has a light transmittance of 80% or more. The term "transparent" indicates that the transmittance of visible light is 60% or more.

Examples of such a substrate include glass substrates and polymer films.

Examples of the material for the polymer film include cellulose-based polymers such as triacetyl cellulose (TAC), diacetyl cellulose, and cellulose acetate propionate; acrylic polymers such as polymethacrylic acid ester, and polyacrylic acid ester; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; polymers having an alicyclic structure such as a norbornene-based polymer, a polymer of monocyclic cyclic olefin, a polymer of cyclic conjugated diene, and a vinyl alicyclic hydrocarbon polymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; or polymers obtained by mixing these polymers.

Among these materials, cellulose-based polymers or polymers having an alicyclic structure are preferable.

In a case where the optical film according to the embodiment of the present invention has a substrate, the thickness of the substrate is not particularly limited, but is preferably 5 to 60 μm and more preferably 5 to 30 μm.

In addition, the thickness of the phase difference layer of the optical film according to the embodiment of the present invention is not particularly limited, but from the reason that the effects of the present invention are more excellent, the thickness thereof is preferably 0.1 to 10 μm and more preferably 0.5 to 5 μm.

[Polarizing Plate]

A polarizing plate according to an embodiment of the present invention is a polarizing plate having the above-described optical film according to the embodiment of the present invention.

In addition, in a case where the above-described substrate does not serve as a polarizer, the polarizing plate according to the embodiment of the present invention has a polarizer.

[Polarizer]

The polarizer of the polarizing plate according to the embodiment of the present invention is not particularly limited as long as the polarizer is a member having a function of converting light into specific linearly polarized light, and a known absorptive type polarizer and reflective type polarizer in the related art can be used.

An iodine-based polarizer, a dye-based polarizer using a dichroic dye, a polyene-based polarizer, or the like is used as the absorptive type polarizer. The iodine-based polarizer and the dye-based polarizer include a coating type polarizer and a stretching type polarizer, and any one of these polarizers can be applied. However, a polarizer which is produced by allowing polyvinyl alcohol to adsorb iodine or a dichroic dye and performing stretching is preferable.

In addition, examples of a method of obtaining a polarizer by performing stretching and dyeing in a state of a laminated film in which a polyvinyl alcohol layer is formed on a substrate include methods disclosed in JP5048120B, JP5143918B, JP4691205B, JP4751481B, and JP4751486B, and known technologies related to these polarizers can be preferably used.

A polarizer in which thin films having different birefringence are laminated, a wire grid type polarizer, a polarizer in which a cholesteric liquid crystal having a selective reflection range and a ¼ wavelength plate are combined, or the like is used as the reflective type polarizer.

Among these, from the viewpoint of further improving adhesiveness, a polarizer including a polyvinyl alcohol-based resin (a polymer including —$CH_2$—CHOH— as a repeating unit; in particular, at least one selected from the group consisting of polyvinyl alcohol and an ethylene-vinyl alcohol copolymer) is preferable.

In the present invention, the thickness of the polarizer is not particularly limited, but is preferably 3 μm to 60 μm, more preferably 5 μm to 30 μm, and even more preferably 5 μm to 15 μm.

[Pressure Sensitive Adhesive Layer]

The polarizing plate according to the embodiment of the present invention may have a pressure sensitive adhesive layer disposed between the phase difference layer in the optical film according to the embodiment of the present invention and the polarizer.

The pressure sensitive adhesive layer used for lamination of the phase difference layer and the polarizer is, for example, a substance in which a ratio (tan δ=G"/G') of loss elastic modulus G" to storage elastic modulus G' is 0.001 to 1.5, where G' and G" are measured with a dynamic viscoelastometer. Such a substance includes a so-called pressure sensitive adhesive or easily creepable substance. Examples of the pressure sensitive adhesive which can be used in the present invention include a polyvinyl alcohol-based pressure sensitive adhesive, but the gluing agent is not limited thereto.

[Image Display Device]

An image display device according to an embodiment of the present invention is an image display device having the optical film according to the embodiment of the present invention or the polarizing plate according to the embodiment of the present invention.

A display element used for the image display device according to the embodiment of the present invention is not particularly limited, and examples thereof include a liquid crystal cell, an organic electroluminescent (hereinafter, abbreviated as "EL") display panel, and a plasma display panel.

Among these, a liquid crystal cell or an organic EL display panel is preferable, and a liquid crystal cell is more preferable. That is, as the image display device according to the embodiment of the present invention, a liquid crystal display device using a liquid crystal cell as a display element or an organic EL display device using an organic EL display panel as a display element is preferable, and a liquid crystal display device is more preferable.

[Liquid Crystal Display Device]

A liquid crystal display device as an example of the image display device according to the embodiment of the present invention is a liquid crystal display device including the polarizing plate according to the embodiment of the present invention and a liquid crystal cell.

In the present invention, it is preferable that the polarizing plate according to the embodiment of the present invention is used for a polarizing plate of the front side, out of polarizing plates provided on both sides of the liquid crystal cell, and it is more preferable that the polarizing plate according to the embodiment of the present invention is used for the polarizing plates on the front and rear sides.

Hereinafter, the liquid crystal cell constituting the liquid crystal display device will be described in detail.

<Liquid Crystal Cell>

The liquid crystal cell used for the liquid crystal display device is preferably a vertical alignment (VA) mode, an optically compensated bend (OCB) mode, an in-plane-switching (IPS) mode, or a twisted nematic (TN) mode, but the liquid crystal cell is not limited thereto.

In a TN mode liquid crystal cell, rod-like liquid crystal molecules are substantially aligned horizontally in a case where no voltage is applied thereto and are further aligned in a twisted manner in a range of 60° to 120°. The TN mode liquid crystal cell is most often used in a color TN liquid crystal display device and is mentioned in numerous literature.

In a VA mode liquid crystal cell, rod-like liquid crystal molecules are substantially aligned vertically in a case where no voltage is applied thereto. Examples of the VA mode liquid crystal cells include (1) a VA mode liquid crystal cell in a narrow sense (described in JP1990-176625A (JP-H02-176625A)) in which rod-like liquid crystal molecules are substantially aligned vertically in a case where no voltage is applied thereto and are substantially aligned horizontally in a case where a voltage is applied thereto, (2) a multi-domain VA mode (MVA mode) liquid crystal cell for enlarging the viewing angle (SID97, described in Digest of Tech. Papers (Proceedings) 28 (1997) 845), (3) a liquid crystal cell in a mode (n-ASM mode) in which rod-like liquid crystal molecules are substantially aligned vertically in a case where no voltage is applied thereto and are aligned in twisted multi-domain alignment in a case where a voltage is applied thereto (described in Proceedings of Japanese Liquid Crystal Conference, 58 and 59 (1998)), and (4) a SURVIVAL mode liquid crystal cell (presented in LCD International 98). The liquid crystal cell may be any one of a patterned vertical alignment (PVA) type, an optical alignment type, or a polymer-sustained alignment (PSA) type. These modes are described in detail in JP2006-215326A and JP2008-538819A.

In an IPS mode liquid crystal cell, rod-like liquid crystal molecules are substantially aligned parallel to a substrate and application of a voltage parallel to a surface of the substrate causes the liquid crystal molecules to respond planarly. In the IPS mode, black display occurs in a case where no voltage is applied and the absorption axes of a pair of upper and lower polarizing plates are orthogonal to each other. A method of improving the viewing angle by reducing light leakage during black display in an oblique direction using an optical compensation sheet is described in JP1998-054982A (JP-H10-054982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

[Organic EL Display Device]

Suitable examples of the organic EL display device which is an example of the image display device according to the embodiment of the present invention include an aspect which includes, from the viewing side, the polarizing plate according to the embodiment of the present invention, a plate having a λ/4 function (hereinafter, also referred to as a "λ/4 plate"), and an organic EL display panel in this order.

Here, the "plate having a λ/4 function" refers to a plate having a function of converting linearly polarized light at a specific wavelength into circularly polarized light (or circularly polarized light into linearly polarized light). Specific examples of an aspect in which the λ/4 plate is a single layer structure include a stretched polymer film and a phase difference film in which an optically anisotropic film having a λ/4 function is provided on a support. Specific examples of an aspect in which the λ/4 plate is a multilayer structure include a broadband λ/4 plate obtained by laminating the λ/4 plate and a λ/2 plate.

In addition, the organic EL display panel is a display panel configured using an organic EL element in which an organic light-emitting layer (organic electroluminescent layer) is sandwiched between electrodes (between a cathode and an anode). The configuration of the organic EL display panel is not particularly limited, and any known configuration is adopted.

EXAMPLES

Hereinafter, the features of the present invention will be more specifically described using Examples and Comparative Examples. The materials, amounts used, proportions, treatment contents, treatment procedures, and the like shown in the following examples can be modified as appropriate in the range of not departing from the spirit of the present invention. Therefore, the scope of the present invention should not be construed as being limited to the following specific examples.

[Synthesis of Polymer Compound]

A polymer compound was synthesized as follows.

Since polymer compounds (A-1) to (A-16), (A-21), and (A-22) include the above-described repeating unit represented by Formula (I), the above-described repeating unit represented by Formula (II), the above-described repeating unit represented by Formula (III), and the above-described repeating unit represented by Formula (IV), the polymer compounds correspond to the polymer compound according to the embodiment of the present invention.

On the other hand, since a polymer compound (B-1) does not include the above-described repeating unit represented by Formula (III), the polymer compound does not correspond to the polymer compound according to the embodiment of the present invention. In addition, since a polymer compound (B-2) does not include the repeating unit represented by Formula (II), the polymer compound does not correspond to the polymer compound according to the embodiment of the present invention.

Example 1

24.3 g of methyl ethyl ketone was charged into a 300 mL three-neck flask equipped with a stirrer, a thermometer, a reflux condenser, and a nitrogen gas inlet tube, and was heated to 79° C.

Next, a mixed solution consisting of 24.0 g (112.0 mmol) of ethylene glycol monoacetoacetate monomethacrylate (AAEM), 9.0 g (104.6 mmol) of methacrylic acid (MA), 9.0 g (40.5 mmol) of isoboronyl methacrylate (IBXMA), 18.0 g (54.2 mmol) of 2-(perfluorobutyl)ethyl methacrylate (PFBMA), 32.1 g of methyl ethyl ketone, and 2.4 g (10.4 mmol) of azo polymerization initiator (V-601, manufactured by FUJIFILM Wako Pure Chemical Corporation) was added dropwise at a constant speed such that the dropwise addition was completed in 120 minutes.

After the dropwise addition, stirring was further continued for 5 hours. After cooling, 31.2 g of methyl ethyl ketone was added to obtain a solution of a polymer compound (A-1) represented by Formula (A-1) described above in methyl ethyl ketone.

The weight-average molecular weight (Mw) of the obtained polymer compound (A-1) was 25,000.

Examples 2 to 18 and Comparative Examples 1 and 2

Polymer compounds (A-2) to (A-16), (A-21), and (A-22) represented by Formulae (A-2) to (A-16), (A-21) described above, and (A-22) and polymer compounds (B-1) and (B-2) represented by Formulae (B-1) and (B-2) described below were obtained according to the same method as in Example 1, except that the type of monomer used was changed to the monomer shown in the column of "Monomer" in Table 1, the charging ratio (mass ratio) of monomer was changed to the charging ratio shown in the column of "wt %" in Table 1. Numbers in Formulae (B-1) and (B-2) described below represent the content (% by mass) of each repeating unit.

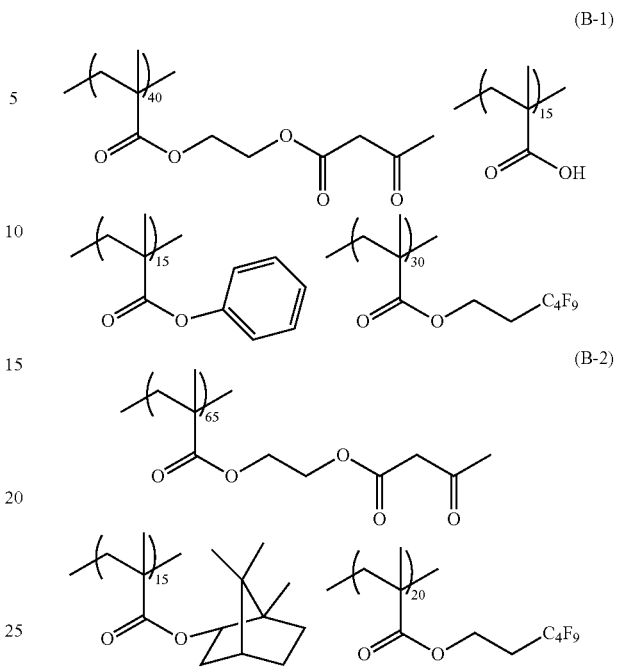

Here, abbreviations shown in the column of "Monomer" in Table 1 respectively represent the following monomers. Since PhMA has an aspect in which $R^5$ in Formula (III) is an aromatic group, PhMA is not the monomer as the repeating unit represented by Formula (III). However, for convenience, PhMA is listed in the column of "Monomer" in Formula (III).

AAEM: ethylene glycol monoacetoacetate monomethacrylate
MA: methacrylic acid
MOBA: mono(2-methacryloyloxyethyl) succinate
IBXMA: isoboronyl methacrylate
LMA: lauryl methacrylate
DCPMA: dicyclopentanyl methacrylate
MADMA: 2-methyl-2-adamantyl methacrylate
ADMA: 1-adamantyl methacrylate
CyMA: cyclohexyl methacrylate
2EHMA: 2-ethylhexyl methacrylate
tBuMA: t-butyl methacrylate
PhMA: phenyl methacrylate
PFBMA: 2-(perfluorobutyl)ethyl methacrylate
DFHA: 1H,1H,7H-dodecafluoroheptyl acrylate

[Production of Optical Film]

Using each of the obtained polymer compounds, an optical film was produced by the following method.

As a substrate, a commercially available cellulose triacetate film "ZRD40SL" (manufactured by FUJIFILM Corporation) was used.

A solution of a liquid crystal composition including a rod-like liquid crystalline compound having the following composition was applied on the ZRD40SL with a wire bar.

In order to dry a solvent of the coating solution and to align and mature the rod-like liquid crystalline compound, the film was heated for 60 seconds with warm air at 40° C.

Next, irradiation (300 mJ/cm$^2$) with ultraviolet rays was performed at 40° C. and an oxygen concentration of 100 ppm under a nitrogen purge to fix the alignment of the liquid crystal compound, thereby producing an optical film having a substrate and a phase difference layer formed of the liquid crystal composition.

The types of the wire bars were #3 and #4, and two films were produced from a solution of one-level liquid crystal composition.

(Solution of Liquid Crystal Composition)

| | |
|---|---:|
| The following rod-like liquid crystalline compound (M1) | 83 parts by mass |
| The following rod-like liquid crystalline compound (M2) | 15 parts by mass |
| The following rod-like liquid crystalline compound (M3) | 2 parts by mass |
| Polymerization initiator (IRGACURE OXE01 manufactured by BASF SE) | 4 parts by mass |
| Polymerizable monomer (A-TMMT-75MJ manufactured by Shin-Nakamura Chemical Co., Ltd.) | 4 parts by mass |
| The following onium salt compound | 1.5 parts by mass |
| The following fluorine-based polymer | 0.3 parts by mass |
| Each polymer compound | 3 parts by mass |
| Toluene | 400 parts by mass |
| Methyl ethyl ketone | 180 parts by mass |

Rod-like liquid crystalline compound (M1)

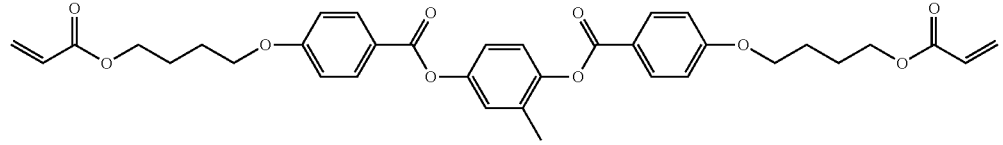 [SMILES: C=CC(=O)OCCCCOc1ccc(C(=O)Oc2ccc(OC(=O)c3ccc(OCCCCOC(=O)C=C)cc3)c(C)c2)cc1]

Rod-like liquid crystalline compound (M2)

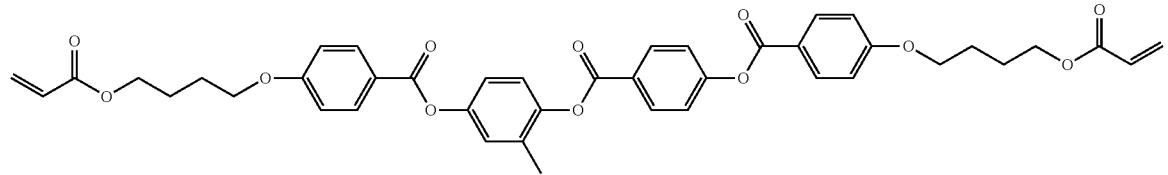 [SMILES: C=CC(=O)OCCCCOc1ccc(C(=O)Oc2ccc(C(=O)Oc3ccc(OC(=O)c4ccc(OCCCCOC(=O)C=C)cc4)cc3C)cc2)cc1]

Rod-like liquid crystalline compound (M3)

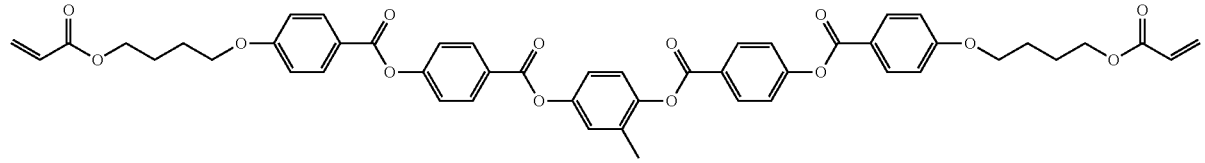 [SMILES: C=CC(=O)OCCCCOc1ccc(C(=O)Oc2ccc(C(=O)Oc3ccc(OC(=O)c4ccc(OC(=O)c5ccc(OCCCCOC(=O)C=C)cc5)cc4)c(C)c3)cc2)cc1]

Onium salt compound

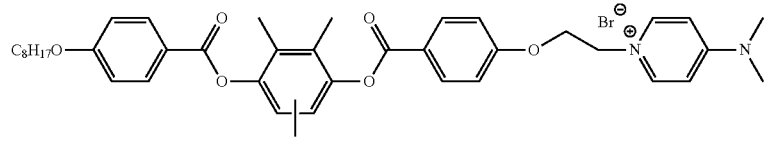

Fluorine-based polymer

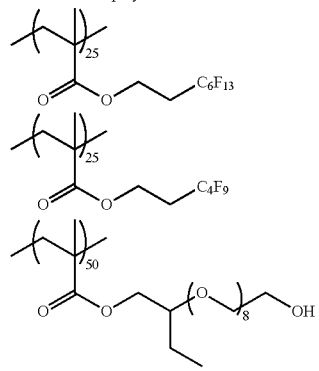

[Evaluation of Alignment]

Regarding the obtained optical films (#3 and #4), alignment was evaluated as follows.

Specifically, a polarizing microscope was set under a crossed Nicols condition, and each of the produced optical films was inserted into a stage. In this case, in a case where the substrate had a slow axis, the stage was rotated such that the slow axis of the substrate was parallel to an analyzer or polarizer of the polarizing microscope.

In a case where each optical film was observed in this state, an optical film in which a uniform dark field was observed for an area of 98% or more was evaluated as "5", an optical film in which a uniform dark field was observed for an area of 95% or more and less than 98% was evaluated as "4", an optical film in which a uniform dark field was observed for an area of 85% or more and less than 95% was evaluated as "3", an optical film in which a uniform dark field was observed for an area of 75% or more and less than 85% was evaluated as "2", and an optical film in which a uniform dark field was observed for an area of less than 75% was evaluated as "1". As the number is larger, the alignment is higher. The results are shown in Table 1. The column of "#3" indicates alignment of the optical film produced by using the #3 wire bar, and the column of "#4" indicates alignment of the optical film produced by using the #4 wire bar.

Practically, the evaluation of the optical film produced by using the #3 wire bar is preferably 2 or more, more preferably 3 or more, still more preferably 4 or more, and particularly preferably 5. In a case where the evaluations of the optical film produced by using the #3 wire bar are the same as each other, it is preferable that alignment of #4 is high.

From the comparison of Examples 9 and 10 (comparison between aspects in which the repeating unit represented by Formula (III) is derived from LMA), Example 9 in which $L^2$ in Formula (II) is a single bond exhibits higher alignment.

From the comparison of Examples 2 and 8 (comparison between aspects in which only the repeating unit represented by Formula (IV) is different), Example 2 in which the repeating unit represented by Formula (IV) is the repeating unit represented by Formula (VII) and X in Formula (VII) is a fluorine atom exhibits higher alignment.

TABLE 1

| | Polymer compound | Formula (I) Monomer | wt % | Formula (II) Monomer | wt % | Formula (III) Monomer | wt % | Formula (IV) Monomer | wt % | Mw | Acid value [mgKOH/g] | Log P | Alignment #3 | #4 |
|---|---|---|---|---|---|---|---|---|---|---|---|---|---|---|
| Example 1 | (A-1) | AAEM | 40 | MA | 15 | IBXMA | 15 | PFBMA | 30 | 25,000 | 193 | 1.53 | 5 | 5 |
| Example 2 | (A-2) | AAEM | 45 | MA | 15 | IBXMA | 15 | PFBMA | 25 | 24,000 | 207 | 1.40 | 5 | 5 |
| Example 3 | (A-3) | AAEM | 55 | MA | 15 | IBXMA | 5 | PFBMA | 25 | 27,000 | 232 | 1.14 | 3 | 2 |
| Example 4 | (A-4) | AAEM | 50 | MA | 5 | IBXMA | 20 | PFBMA | 25 | 25,000 | 154 | 1.63 | 3 | 3 |
| Example 5 | (A-5) | AAEM | 40 | MA | 5 | IBXMA | 25 | PFBMA | 30 | 26,000 | 133 | 1.95 | 2 | 1 |
| Example 6 | (A-6) | AAEM | 40 | MA | 20 | IBXMA | 15 | PFBMA | 25 | 26,000 | 226 | 1.38 | 4 | 3 |
| Example 7 | (A-7) | AAEM | 60 | MA | 20 | IBXMA | 10 | PFBMA | 10 | 24,000 | 281 | 0.91 | 2 | 1 |
| Example 8 | (A-8) | AAEM | 45 | MA | 15 | IBXMA | 15 | DFHA | 25 | 23,000 | 204 | 1.34 | 4 | 3 |
| Example 9 | (A-9) | AAEM | 45 | MA | 15 | LMA | 15 | PFBMA | 25 | 32,000 | 206 | 1.58 | 5 | 4 |
| Example 10 | (A-10) | AAEM | 50 | MOBA | 15 | LMA | 10 | PFBMA | 25 | 33,000 | 159 | 1.32 | 4 | 2 |
| Example 11 | (A-11) | AAEM | 45 | MA | 15 | DCPMA | 15 | PFBMA | 25 | 30,000 | 205 | 1.30 | 5 | 5 |
| Example 12 | (A-12) | AAEM | 45 | MA | 15 | MADMA | 15 | PFBMA | 25 | 21,000 | 203 | 1.33 | 4 | 2 |
| Example 13 | (A-13) | AAEM | 45 | MA | 15 | ADMA | 15 | PFBMA | 25 | 27,000 | 203 | 1.29 | 4 | 2 |
| Example 14 | (A-14) | AAEM | 45 | MA | 15 | CyMA | 15 | PFBMA | 25 | 25,000 | 204 | 1.30 | 5 | 5 |
| Example 15 | (A-15) | AAEM | 45 | MA | 15 | 2EHMA | 15 | PFBMA | 25 | 26,000 | 205 | 1.46 | 5 | 4 |
| Example 16 | (A-16) | AAEM | 45 | MA | 15 | tBuMA | 15 | PFBMA | 25 | 20,000 | 205 | 1.21 | 4 | 2 |
| Example 17 | (A-21) | AAEM | 40 | MA | 12 | IBXMA | 15 | PFBMA | 33 | 23,000 | 180 | 1.63 | 5 | 5 |
| Example 18 | (A-22) | AAEM | 40 | MA | 14 | IBXMA | 15 | PFBMA | 31 | 24,000 | 189 | 1.56 | 5 | 5 |
| Comparative Example 1 | (B-1) | AAEM | 40 | MA | 15 | PhMA | 15 | PFBMA | 30 | 26,000 | 194 | 1.45 | 1 | 1 |
| Comparative Example 2 | (B-2) | AAEM | 65 | — | — | IBXMA | 15 | PFBMA | 20 | 24,000 | 161 | 1.42 | 1 | 1 |

In Table 1, Mw represents the weight-average molecular weight (Mw) of each polymer compound.

In Table 1, the acid value represents the acid value of each polymer compound.

In Table 1, Log P represents the Log P value of each polymer compound.

As can be found in Table 1, compared with Comparative Examples 1 and 2 using a liquid crystal composition not containing the polymer compound according to the embodiment of the present invention, Examples 1 to 18 using the liquid crystal composition containing the polymer compound according to the embodiment of the present invention exhibit high alignment. Among these, Examples 1 to 4, 6, and 8 to 18, in which the acid value of the polymer compound according to the embodiment of the present invention is 150 mgKOH/g to 250 mgKOH/g, exhibit higher alignment. Among these, Examples 1, 2, 6, and 8 to 18, in which the acid value of the polymer compound according to the embodiment of the present invention is 155 mgKOH/g to 250 mgKOH/g and the Log P value of the polymer compound according to the embodiment of the present invention is 1.2 to 1.8, exhibit even higher alignment.

From the comparison of Examples 2, 9, and 11 to 16 (comparison between aspects in which only the repeating unit represented by Formula (III) is different), Examples 2, 9, 11, 14, and 15, in which the repeating unit represented by Formula (III) is the repeating unit represented by Formula (VI), exhibit higher alignment. Among these, Examples 2, 11, and 14, in which the repeating unit represented by Formula (III) has at least one aliphatic cyclic structure, exhibit even higher alignment.

What is claimed is:

1. A polymer compound comprising:
a repeating unit represented by Formula (I);
a repeating unit represented by Formula (II);
a repeating unit represented by Formula (III); and
a repeating unit represented by Formula (IV),

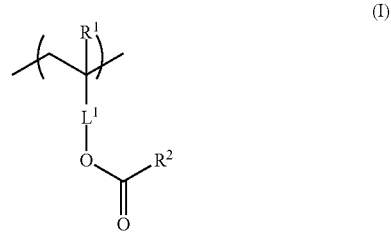

(I)

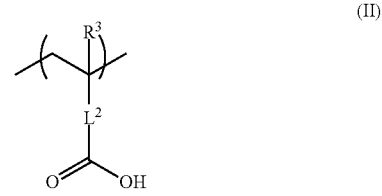

(II)

-continued

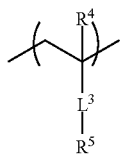
(III)

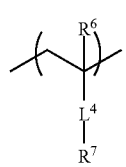
(IV)

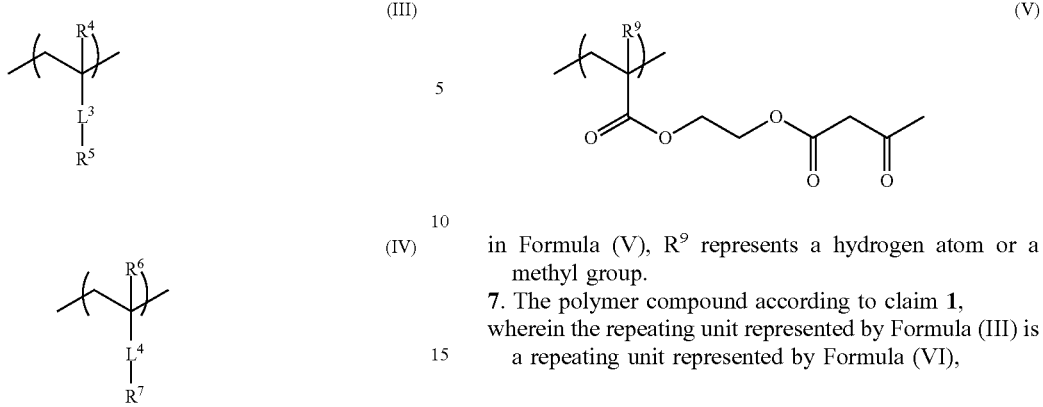
(V)

in Formula (V), $R^9$ represents a hydrogen atom or a methyl group.

7. The polymer compound according to claim 1,
wherein the repeating unit represented by Formula (III) is a repeating unit represented by Formula (VI),

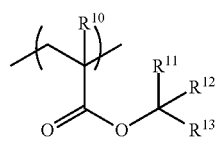
(VI)

in Formula (VI), $R^{10}$ represents a hydrogen atom or a methyl group, $R^{11}$, $R^{12}$ and $R^{13}$ each independently represent a hydrogen atom or an aliphatic group having 1 to 19 carbon atoms, in which a total number of carbon atoms of $R^{11}$, $R^{12}$, and $R^{13}$ is 2 to 19 and at least one of $R^{11}$, $R^{12}$, or $R^{13}$ is a hydrogen atom, and $R^{11}$, $R^{12}$, and $R^{13}$ may be linked to each other to form a cyclic structure.

in Formulae (I) to (IV), $R^1$, $R^3$, $R^4$, and $R^6$ each independently represent a hydrogen atom or a methyl group, $L^1$ represents —(C═O)O—R—, in which R represents a divalent aliphatic group which may have a substituent, or a divalent aromatic group which may have a substituent, and, $L^2$, $L^3$, and $L^4$ each independently represent a single bond or a divalent linking group selected from the group consisting of —O—, —C(═O)—, —(C═O)O—, —(C═O)NR$^8$—, a divalent aliphatic group which may have a substituent, a divalent aromatic group which may have a substituent, and a combination of these groups, in which $R^8$ represents a hydrogen atom or an alkyl group having 1 to 20 carbon atoms, wherein $L^2$ is not —O—, in Formula (I), $R^2$ represents an alkyl group having 1 to 30 carbon atoms, in which, in a case where $R^2$ is an alkyl group having 2 to 30 carbon atoms, one or more of —CH$_2$— constituting the alkyl group may be replaced with —COO— or —CO—, in Formula (III), $R^5$ represents an aliphatic group having 3 to 20 carbon atoms, and in Formula (IV), $R^7$ represents an alkyl group having 4 to 20 carbon atoms, in which at least one hydrogen atom is replaced with a fluorine atom.

2. The polymer compound according to claim 1,
wherein an acid value of the polymer compound is 150 mgKOH/g to 250 mgKOH/g.

3. The polymer compound according to claim 1,
wherein a Log P value of the polymer compound is 1.2 to 1.8,
where the log P value is a sum total of products of a Log P value of a monomer as each repeating unit constituting the polymer compound and a mole fraction of each repeating unit.

4. The polymer compound according to claim 1,
wherein a main chain of the polymer compound is an acrylic or methacrylic polymer.

5. The polymer compound according to claim 1,
wherein the repeating unit represented by Formula (I) has an acetoacetyl group.

6. The polymer compound according to claim 1,
wherein the repeating unit represented by Formula (I) is a repeating unit represented by Formula (V), 8. The polymer compound according to claim 1,
wherein the repeating unit represented by Formula (III) has at least one aliphatic cyclic structure.

9. The polymer compound according to claim 1,
wherein the repeating unit represented by Formula (IV) is a repeating unit represented by Formula (VII),

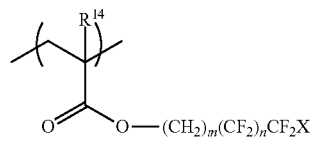
(VII)

in Formula (VII), $R^{14}$ represents a hydrogen atom or a methyl group, X represents a hydrogen atom or a fluorine atom, m and n each independently represents an integer of 1 to 20, and m+n represents an integer of 4 to 21.

10. The polymer compound according to claim 1,
wherein a weight-average molecular weight of the polymer compound is 5,000 to 500,000.

11. A liquid crystal composition comprising:
the polymer compound according to claim 1; and
a liquid crystalline compound having a polymerizable group.

12. A phase difference layer formed of the liquid crystal composition according to claim 11.

13. An optical film comprising:
the phase difference layer according to claim 12.

14. A polarizing plate comprising:
the optical film according to claim 13.

15. An image display device comprising:
the optical film according to claim 13.

16. An image display device comprising:
the polarizing plate according to claim 14.

17. The polymer compound according to claim 2,
wherein a Log P value of the polymer compound is 1.2 to 1.8,
where the log P value is a sum total of products of a Log P value of a monomer as each repeating unit constituting the polymer compound and a mole fraction of each repeating unit.

18. The polymer compound according to claim 2,
wherein a main chain of the polymer compound is an acrylic or methacrylic polymer.

19. The polymer compound according to claim 2,
wherein the repeating unit represented by Formula (I) has an acetoacetyl group.

20. The polymer compound according to claim 2,
wherein the repeating unit represented by Formula (I) is a repeating unit represented by Formula (V),

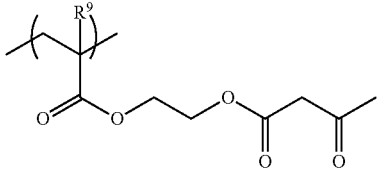

in Formula (V), $R^9$ represents a hydrogen atom or a methyl group.

* * * * *